(12) United States Patent
McPhail

(10) Patent No.: US 10,169,158 B2
(45) Date of Patent: *Jan. 1, 2019

(54) APPARATUS, SYSTEM AND METHOD FOR DATA COLLECTION, IMPORT AND MODELING

(71) Applicant: INTERNATIONAL BUSINESS MACHINES CORPORATION, Armonk, NY (US)

(72) Inventor: Iain McPhail, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/190,260

(22) Filed: Jun. 23, 2016

(65) Prior Publication Data

US 2016/0299817 A1 Oct. 13, 2016

Related U.S. Application Data

(63) Continuation of application No. 13/914,719, filed on Jun. 11, 2013, now Pat. No. 9,411,865.

(30) Foreign Application Priority Data

Aug. 7, 2012 (GB) .................................. 1214118.0

(51) Int. Cl.
*G06F 11/14* (2006.01)
*G06F 17/30* (2006.01)
*G06F 11/07* (2006.01)

(52) U.S. Cl.
CPC ........ *G06F 11/1448* (2013.01); *G06F 11/079* (2013.01); *G06F 11/0709* (2013.01);
(Continued)

(58) Field of Classification Search
CPC ............ G06F 11/1464; G06F 11/1456; G06F 11/1448; G06F 11/0709; G06F 11/0751;
(Continued)

(56) References Cited

U.S. PATENT DOCUMENTS 6,546,404 B1 * 4/2003 Davis ................. G06F 11/1451
7,222,133 B1 5/2007 Raipurkar et al.
(Continued)

FOREIGN PATENT DOCUMENTS

GB 2504718 A 2/2014

OTHER PUBLICATIONS

Pending U.S. Appl. No. 15/180,169, filed Jun. 13, 2016, entitled: "Apparatus, System and Method for Data Collection, Import and Modeling", 32 pages.
(Continued)

*Primary Examiner* — Robert W Beausoliel, Jr.
*Assistant Examiner* — Susan F Rayyan
(74) *Attorney, Agent, or Firm* — L. Jeffrey Kelly

(57) ABSTRACT

A method for data analysis of a backup system, including interrogating a plurality of computer systems to generate for each computer system at least one dump file, each dump file including configuration and state information; extracting predetermined configuration and state information from the respective dump files; and storing the extracted configuration and state information in a database in a normalized format.

20 Claims, 7 Drawing Sheets

(52) U.S. Cl.
CPC ...... *G06F 11/0751* (2013.01); *G06F 11/0778* (2013.01); *G06F 11/1456* (2013.01); *G06F 11/1464* (2013.01); *G06F 17/30076* (2013.01); *G06F 17/30088* (2013.01); *G06F 17/30312* (2013.01); *G06F 17/30569* (2013.01); *G06F 2201/84* (2013.01)

(58) Field of Classification Search
CPC ............... G06F 11/0778; G06F 11/079; G06F 17/30569; G06F 17/30312; G06F 17/300312; G06F 17/30076; G06F 17/30088
See application file for complete search history.

(56) References Cited

U.S. PATENT DOCUMENTS

| | | | |
|---|---|---|---|
| 8,315,981 B2 * | 11/2012 | Prahlad | G06F 11/1458 707/640 |
| 8,930,319 B2 | 1/2015 | Crescenti et al. | |
| 2003/0182301 A1 * | 9/2003 | Patterson | G06F 11/1458 |
| 2003/0208488 A1 | 11/2003 | Perrizo | |
| 2005/0120162 A1 | 6/2005 | Sivaram | |
| 2007/0073791 A1 | 3/2007 | Bruce et al. | |
| 2008/0147754 A1 * | 6/2008 | Littlefield | G06F 17/302 |
| 2009/0254999 A1 | 10/2009 | Julin et al. | |
| 2009/0276591 A1 | 11/2009 | Mu et al. | |
| 2010/0332453 A1 | 12/2010 | Prahlad et al. | |
| 2011/0110515 A1 | 5/2011 | Tidwell et al. | |
| 2011/0276607 A1 | 11/2011 | Surna et al. | |
| 2013/0262389 A1 * | 10/2013 | Rathof | G06F 11/1464 707/642 |
| 2014/0046952 A1 | 2/2014 | McPhail | |
| 2017/0132070 A1 * | 5/2017 | Prasad | G06F 11/0793 |
| 2017/0199688 A1 * | 7/2017 | Ankireddypalle | G06F 3/0619 |
| 2017/0199884 A1 * | 7/2017 | Gokhale | G06F 17/30082 |
| 2017/0300254 A1 * | 10/2017 | Mutha | G06F 3/0619 |

OTHER PUBLICATIONS

Pending U.S. Appl. No. 15/185,091, filed Jun. 17, 2016, entitled: "Apparatus, System and Method for Data Collection, Import and Modeling", 32 pages.

* cited by examiner

APPARATUS, SYSTEM AND METHOD FOR DATA COLLECTION, IMPORT AND MODELING

BACKGROUND

Field of the Invention

The present invention relates to an apparatus, system and method for collecting, importing and modeling data, in particular data stored in a variety of computer systems.

Background of Invention

Organizations are running ever more sophisticated computer systems. For example, a small business with only 30 employees located at a single site may run one or two networks, with a single server. Employees may have different workstations or computers, manufactured by different OEMs and using different operating systems. The types of data created and manipulated by different employees will vary depending on their role, and the software they use.

As the requirements of IT systems grow organically, so the number of workstations, networks, servers and storage devices increases. Moreover, there is increasing variation in the OEM product and IT systems used within an organization. In larger organizations with thousands of employees spread across many sites, there is considerable variation in hardware and software both within and between the sites. Moreover, data retention and protection policies may vary between sites and between departments within (or between) sites. Accordingly, it is becoming increasingly difficult to manage data, especially within larger organizations and to ensure that data is most efficiently and cost-effectively stored, with maximum control and minimum access times. It is also difficult to manage the transfer of data from legacy hardware to replacement equipment as the IT infrastructure is refreshed.

Typically, all (or at least all important) information stored by an organization is backed up overnight or at other regular intervals. There are two primary reasons for backing up data. The first is to recover data after loss. The second is to allow recovery of data from an earlier time according to a user-defined retention policy. Accordingly, backed up data will commonly be given an expiry date setting the time for which the copy of the backed up data should be kept.

Since at least one copy must be made of all data on a computer system that is worth saving, storage requirements can be very large and back up systems can be very complicated. To add to the complexity, there are many different types of storage data that are useful for making back ups, many different back up models, many different access types and many different providers of back up solutions.

Briefly, back ups can be unstructured, which are generally file system type back ups, with a copy of data made on a medium or series of media with minimal information about what was backed up and when, an structured, which generally use product specific formats such as SQL, Oracle and BD2.

Irrespective of whether structured or unstructured, back ups may be: full, in which complete system images are made at various points in time; incremental, in which data is organized into increments of change between different points in time; reverse delta, in which a mirror of the recent source data is kept together with a series of differences between the recent mirror and earlier states; and continuous, in which all changes to data are immediately stored.

In addition, various media can be used for storing data, including magnetic tapes, hard disk, optical storage, floppy disk and solid state storage. Typically, an enterprise will hold its own back up media devices, but remote back up services are becoming more common.

To add a further layer of complexity, back up may be: on-line, in which an internal hard disk or disk array is used; near-line, such as a tape library with a mechanical device to move media units from storage to a drive where the media can be read/written; off-line, in which direct human action is required to make access to the storage media physically possible; off-site; or at a disaster recovery centre.

Moreover, the different back up providers use proprietary systems for organizing back ups. These systems can handle the copying or partial copying of files differently; and they can copy file systems differently, for example by taking a file system dump or by interrogating an archive bit or by using a versioning file system. They may also handle the back up of live data in different ways. In addition to copying file data, back up systems will commonly make a copy of the metadata of a computer system, such as a system description, boot sector, partition layout, file metadata (file permissions, owner, group etc), and system metadata (as different operating systems have different ways of storing configuration information).

In addition, the different back up providers frequently manipulate the data being backed up to optimize the back up speed, the restore speed, data security, media usage and bandwidth requirements. Such manipulation may involve compression, duplication and reduplication, encryption, multiplexing, refactoring and staging, and varies between the different products and different vendors.

It will be apparent that when a number of different back up systems are used, it can be very difficult to properly manage data. Similar or greater degrees of complexity arise in computer systems in the primary storage layer, which acts as the source of data to be backed up by back up systems.

SUMMARY

Accordingly, it is an object of the present invention to provide an apparatus, system and method to simplify the management of data across computer systems.

According to a first aspect of the present invention, there is provided A method of data analysis, including: interrogating a plurality of computer systems to generate for each computer system at least one dump file, each dump file including configuration and state information; extracting predetermined configuration and state information from the respective dump files; and storing the extracted configuration and state information in a database in a normalized format.

Preferably, the method further includes transforming the predetermined configuration and state information to the normalized format from a format that is at least one of vendor and product specific.

Preferably, the interrogating includes using a collector tool to query each computer system using the computer system's native interface.

Preferably, at least one said native interface includes a standard command line interface and the respective collector tool is adapted to run a predetermined series of commands.

More preferably, the collector tool is adapted to generate the dump file by collating responses by the computer system to the predetermined series of commands.

In these cases, the method preferably further includes providing different collector tools for different computer system environments.

Preferably, the extracting and storing includes using an importer tool, said importer tool being arranged to extract the predetermined configuration and state information from the dump files, transform the extracted information into the normalized format and store the transformed information in the normalized format in the database.

Here, the method preferably further includes providing a different importer tool for each collector tool.

Preferably, each said computer system is at least one of a back-up computer system, a primary storage layer computer system and an application layer computer system.

Preferably, the configuration and state information relates to a plurality of objects and includes metadata about the objects stored on the plurality of computer systems.

More preferably, the metadata describes the physical storage location of each object.

Preferably, the metadata for each object includes at least one of customer data, site data, source data, node data, object data and fragment data.

In this case, it is preferred that the object data includes at least one of time of creation, size, number of files and expiry date.

Preferably, the fragment data describes the physical location of the object on at least one storage medium.

Preferably, the plurality of computer systems are geographically dispersed.

Preferably, the plurality of computer systems use at least two different proprietary data formats.

Preferably, the computer systems store data on at least two different types of storage media.

According to another aspect of the present invention, there is provided a data repository including: a storage device storing in a normalized format an index of data stored on a plurality of computer systems, whereby the configuration and state details of each computer system can be determined.

Preferably, each said computer system is at least one of a back-up computer system, a primary storage layer computer system and an application layer computer system.

Preferably, the data includes a plurality of objects and the index includes metadata about the objects stored on the plurality of computer systems.

In this case, it is preferred that the metadata describes the physical storage location of each object.

It is also preferred that the metadata for each object includes at least one of customer data, site data, source data, node data, object data and fragment data.

It is more preferred that the object data includes at least one of time of creation, size, number of files and expiry date.

It is also more preferred that the fragment data describes the physical location of the object on at least one storage medium.

Preferably, the plurality of computer systems are geographically dispersed.

Preferably, the computer systems store data on at least two different types of storage media.

According to a further aspect of the present invention, there is provided a data system, including: a data repository as described above; and an importer, wherein the importer is arranged to extract predetermined configuration and state information generated from a plurality of computer systems, translate the extracted information into the normalized format and store the transformed information in the normalized format in the index.

Preferably the system includes at least one collector arranged to interrogate a said computer system to generate configuration and state information of the computer system, said generated configuration and state information being in a format native to the computer system.

More preferably, the collector is arranged to query the computer system using the computer system's native interface.

Yet more preferably, the native interface includes a standard command line interface and the collector is adapted to run a predetermined series of commands.

It is further preferable that the collector is adapted to generate a dump file by collating responses by the computer system to the predetermined series of commands.

Preferably, the system further includes different collectors for different computer system environments.

Preferably, the system further includes a different importer for each collector.

Preferably, the system further includes the plurality of computer systems.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
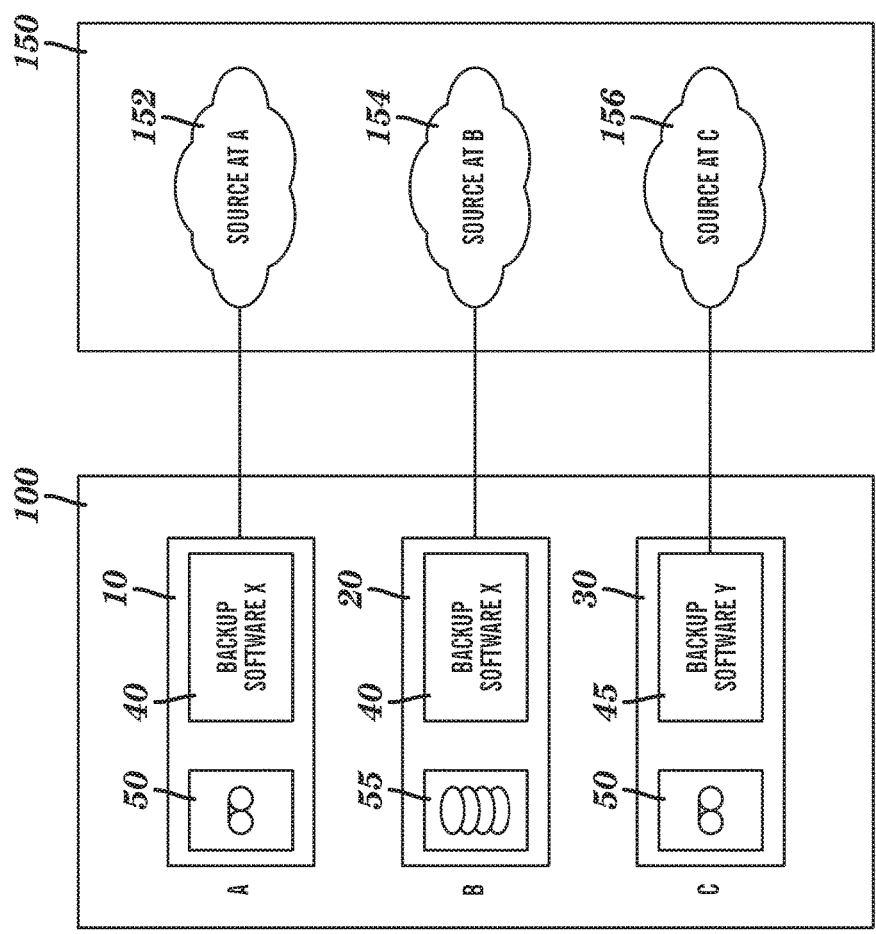
FIG. 1 is a schematic representation of a plurality of back up systems.

FIG. 1 schematically shows the back up storage layer 100 of an exemplary organization, which may be termed customer 1. As shown in the figure, the organization operates three different computer back up systems 10, 20, 30, each being an example of a computer system within the meaning of the present specification. In this example, each back up system 10, 20, 30 is provided at a different site, although it is possible for two or more systems to be provided at the same site or for two or more sites to be backed up using one system.

Each back up system 10, 20, 30 includes a back up server 40, 45 and storage media 50, 55. In particular, the back up server 40, 45 is responsible for managing the back up operation of data from a respective source 152, 154, 156 in a primary storage layer 150. Thus, the sources 152, 154, 156 act as data sources for the back up and may include servers, and laptop and desktop computers, for example. The back up servers 40, 45 back up the data from the primary storage layer 150 to the storage media 50, 55. In this example, systems 10 and 20 use a proprietary back up server 40 provided by as product X by a particular vendor and system 30 uses a different proprietary back up server 45 provided as product Y by a different vendor (although different vendors can of course produce different products, which may or may not be compatible with one another). The back up server 40, 45 is implemented in software or hardware or both.

Figure 7:
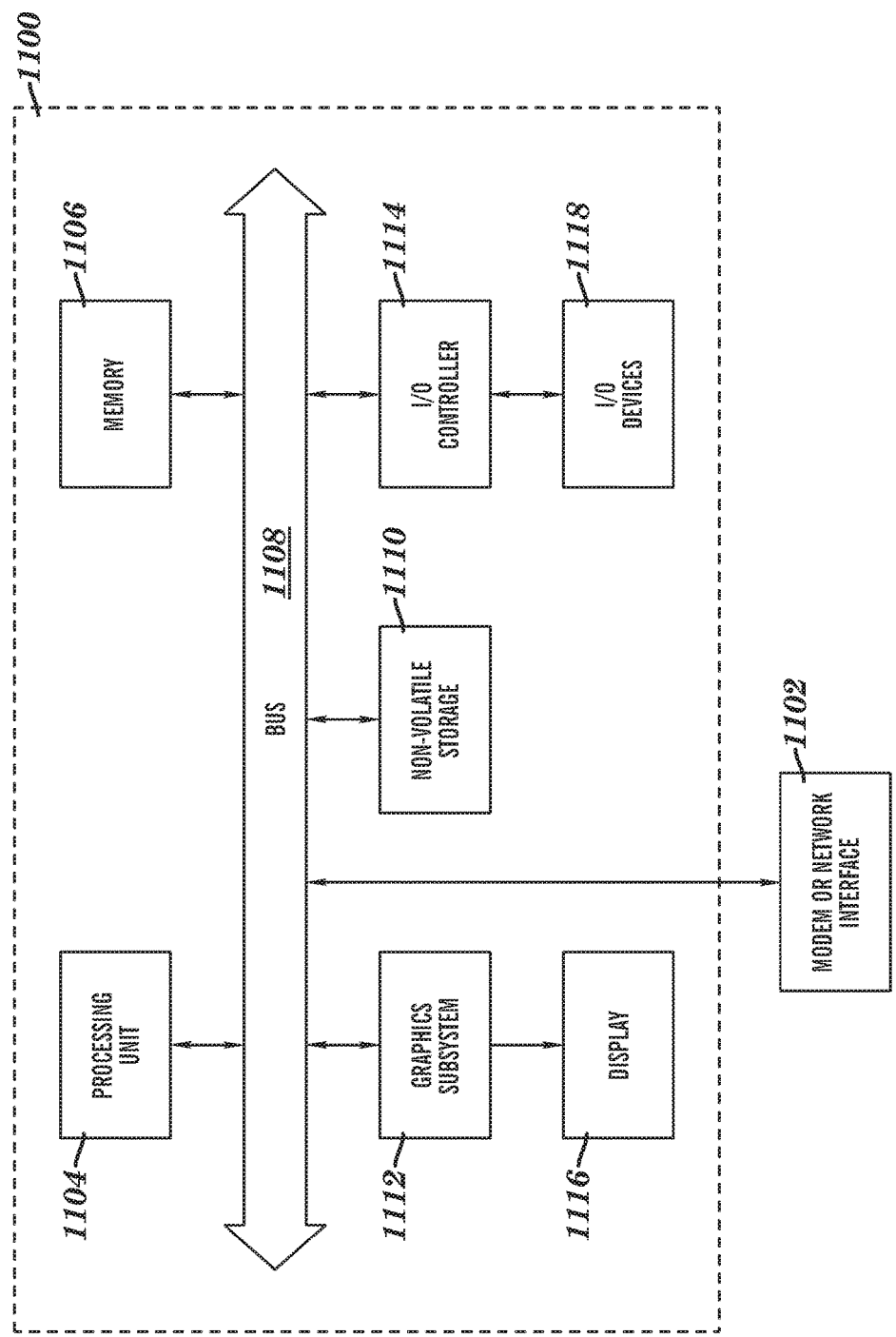
FIG. 7 illustrates an exemplary embodiment of a computer system 1100 that may be used in various elements of the present invention.

FIG. 7 illustrates an exemplary computer architecture 1100 by which the back up server 40, 45 may be implemented. Computer architecture 1100 may be or form part of a desktop computer or a laptop computer, a server within the primary storage layer, or any similar computer device, but the back up server 40, 45 is preferably implemented as a stand alone server.

The computer architecture 1100 may interface to external devices such as the storage media 50, 55 and the primary storage layer 150 through a modem or network interface 1102, such as an analogue modem, ISDN modem, cable modem, token ring interface, or satellite transmission interface. As shown in FIG. 7, the computer architecture 1100 includes a processing unit 1104, which may be a conventional microprocessor, such as an Intel Pentium microprocessor, an Intel Core Duo microprocessor, or a Motorola Power PC microprocessor, which are known to one of ordinary skill in the computer art. System memory 1106 is coupled to the processing unit 1104 by a system bus 1108. System memory 1106 may be a DRAM, RAM, static RAM (SRAM) or any combination thereof. Bus 1108 couples processing unit 1104 to system memory 1106, to nonvolatile storage 1110, to graphics subsystem 1112 and to input/output (I/O) controller 1114. Graphics subsystem 1112 controls a display device 1116, such as a liquid crystal display, which may be part of the graphics subsystem 1112. The I/O devices 1118 may include one or more of a keyboard, disk drives, printers, a mouse, a touch screen and the like as known to one of ordinary skill in the computer art.

The back up server 40, 45 control software will normally be stored on the nonvolatile storage 1110. Thus, it may be stored on the machine's hard drive, or possibly on an externally connectable storage medium, such as a USB memory stick or a CD. These two devices would then constitute part of the I/O devices shown as item 1118 in FIG. 7. The nonvolatile storage may also store indexing data created by the back up server 40, 45 discussed below.

Back up systems 10 and 30 use tape storage media 50 provided at their respective sites, whereas system 20 uses disc storage media 55 provided at its respective site. Each of the back up servers 40, 45 will schedule the back up data from the source location(s) and will store the data in the manner particular to respective vendor or the respective vendor's product, including manipulation of the backed up data. In particular, each back up server 40, 45 will store an index of the data backed up in a format specific to the respective product. The formats vary significantly between vendors, who use different names for similar concepts and also store data and record the storing of data in different ways. The type of information stored in the indexes may also vary depending on the type of physical media. Thus, since systems 10 and 20 use different types of storage media 50 and 55, the type of information stored in the index of back up server 40 in system 10 may vary from the type of information stored in the index of back up server 40 of system 20, even though they are the same product.

Accordingly, it is very difficult to understand and compare what data is backed up on each of the three back up systems 10, 20 and 30 in the simple arrangement shown in FIG. 1. This can make it very difficult to determine how best the systems can be improved and how best to access data between back up systems.

To obviate these difficulties, the present invention provides a method and system including a database and tools to collect, store and provide analyses of the configuration and state details of a large number of disparate and geographically dispersed computer systems in a consistent and scalable manner.

Figure 2:
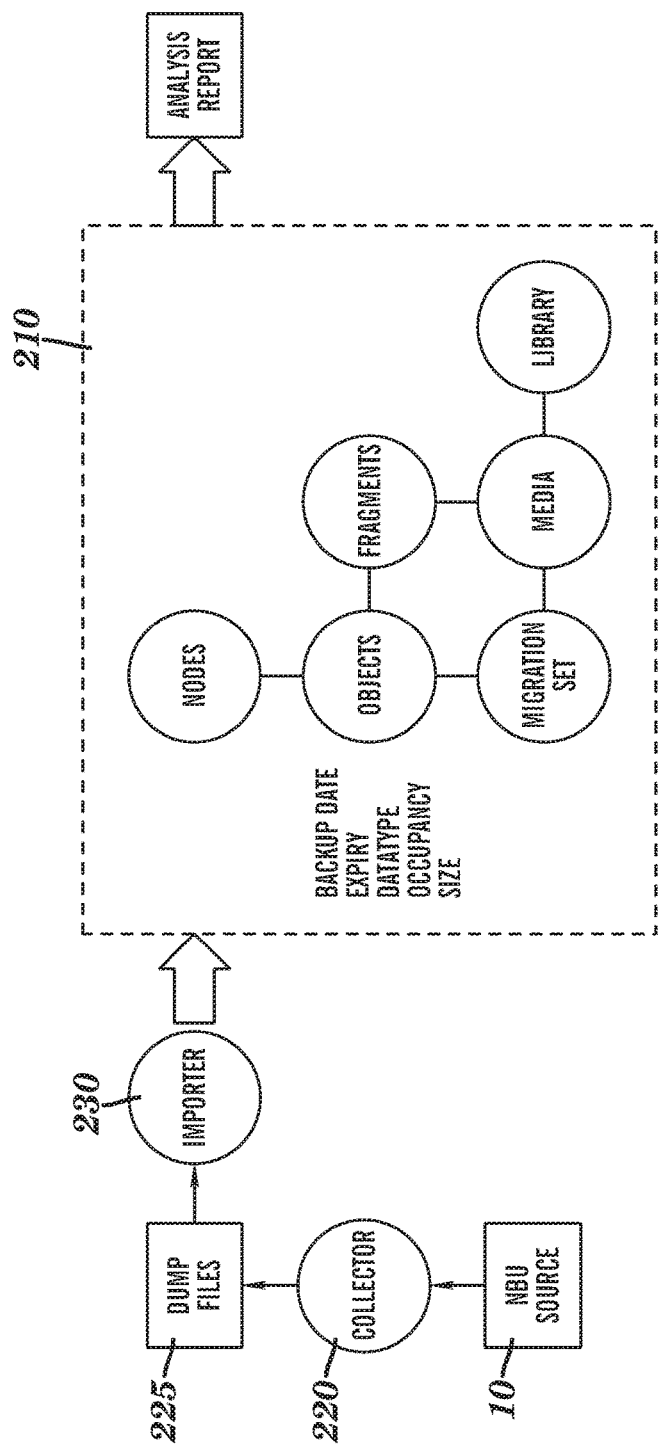
FIG. 2 is a schematic representation of a system and method according to the present invention applied to a single computer system.

In the present embodiment, as shown in FIG. 2, the system 200 of the invention includes a database or index 210 which stores information on the configuration and state of the back up system 10 shown in FIG. 1. The database 210 is populated by running by a collection tool or collector 220, which interrogates the back up system 10 through the systems' native interfaces, such as the standard command line interface of the proprietary back up server 40. In particular, the collector 220 runs a series of commands (queries) and receives as a result of these commands information from the back up system 10 in the product specific format and configuration. The collector 220 generates dump files 225, which contain the product specific configuration and state information.

The dump files 225 are then processed using importers 230 specifically provided to extract predetermined system configuration and state information deemed important to underpin the required subsequent analysis.

The extracted configuration and state information is translated by the importer 230 from its vendor and product specific format into an internal normalized format (data model) before being stored in the database 210.

The internal normalized format (data model) contains all the necessary data points for subsequent analysis in a normalized and consistent manner independent of the mix of vendors' products being analyzed and any products' idiosyncrasies or different ways of expressing its configuration and state.

The database 210 may be stored and accessed using any suitable known means. For example, it may be stored on a server, for example on a hard drive or an array of hard drives. The database server or other storage device may have the same architecture as that shown in FIG. 7. Alternatively, it may distributed and stored across a number of different servers at the same or geographically dispersed locations. The database may be stored on the RAM 1106 or the nonvolatile storage 1110 of the server having the architecture shown in FIG. 7.

The collector 220 may be implemented in hardware, in software or in a combination of hardware and software. Preferably, it is implemented in the form of software either stored on an optical or magnetic medium, or downloaded over a network, such as the Internet. The collector 220 may be implemented on the hardware of the database 210 or separate hardware. More preferably, it is loaded on a ROM 1110 and implemented in RAM 1106 of the back up server 40, 45. In particular, it may be called by the microprocessor 1104 of the back up server 40, 45 at predetermined times, or on a one off basis. Each collector 220 is adapted to operate with a particular back up server 40, 45. Accordingly, different collectors 220 are provided for the different back up servers 40, 45, although in alternative embodiments different collectors 220 are provided for different systems 10, 20, 30, or a single collector 220 may be adapted to operate on two or more systems 10, 20, 30 or two or more back up servers 40, 45. In a further alternative, two or more collectors 220 may be provided for a back up server 40, 45.

Similarly, the importer 230 may be implemented in hardware, in software or in a combination of hardware and software. Preferably, it is implemented in the form of software either stored on an optical or magnetic medium, or downloaded over a network, such as the Internet. The importer 230 may be stored on the ROM 1110 and implemented in the RAM 1106 of the back up server 40, 45 or more preferably of the hardware on which the database 210 is stored, or it may be implemented in separate hardware. The importer 230 communicates with the collector 220 and the hardware storing the database 210 by any suitable means, including a direct connection, or over a network such as the Internet. Each importer 230 is adapted to operate with a particular collector 220. Accordingly, different importers 230 are provided for different collectors 220, although in alternative embodiments a single importer 230 may be adapted to operate with two or more collectors 220, or two or more importers 230 may be adapted to operate with one collector 220.

Figure 6:
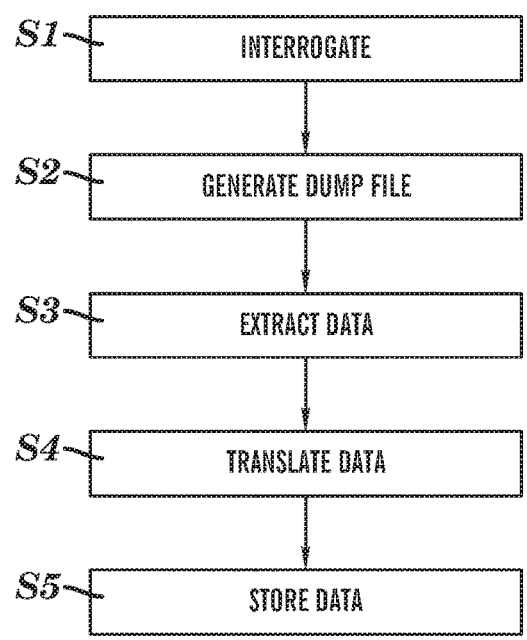
FIG. 6 is a flowchart illustrating a method according to the present invention.

The process of this embodiment of the present invention is illustrated in FIG. 6. As shown in step S1, the back up system 10, 20, 30 is interrogated using the collector 220. In particular, using the standard command line interface particular to the respective back up server 40, 45, the collector 220 inputs a series of standard commands understood by the back up server 40, 45. In response to the commands, the back up system 10, 20, 30 (back up server 40, 45) outputs configuration and state information in the format particular to the source 10, 20, 30 (back up server 40, 45). The collector 220 uses the output configuration and state information to generate one or more dump files 225 in step S2, which are passed to and received by (or fetched by) the importer 230. The configuration and state information in the dump files are in the format of used by the back up system 10, 20, 30. In this embodiment, the dump files are in the format used by the back up server 40, 45.

In step S3, the importer 230 extracts predetermined configuration and state information from the dump files 225. The importer 230 is adapted to understand or work with the format of the dump file and so is able to search for and extract the predetermined information in that format. Once extracted, the importer 230 is adapted to translate the format of the extracted data in step S4 to the normalized format used in the database 210 of the present invention.

Finally, in step S5 the importer 230 stores the normalized configuration and state information in the database 210.

It should be appreciated that steps S3 and S4 can be reversed, so that all the data in the dump files 225 is first translated into the normalized format, and the predetermined data is then extracted and stored. However, it is generally more efficient to carry data extraction out first.

The normalized format is a data model adapted to store specific configuration and state data for the back up system 10, 20, 30. In particular, the normalised format includes information about the data stored on the media 50, 55 irrespective of the type of media and irrespective of the product type of the back up server 40, 45. The information included in the normalized format includes all information required to carry out data analysis for which the embodiment of the present invention is designed.

Figure 3:
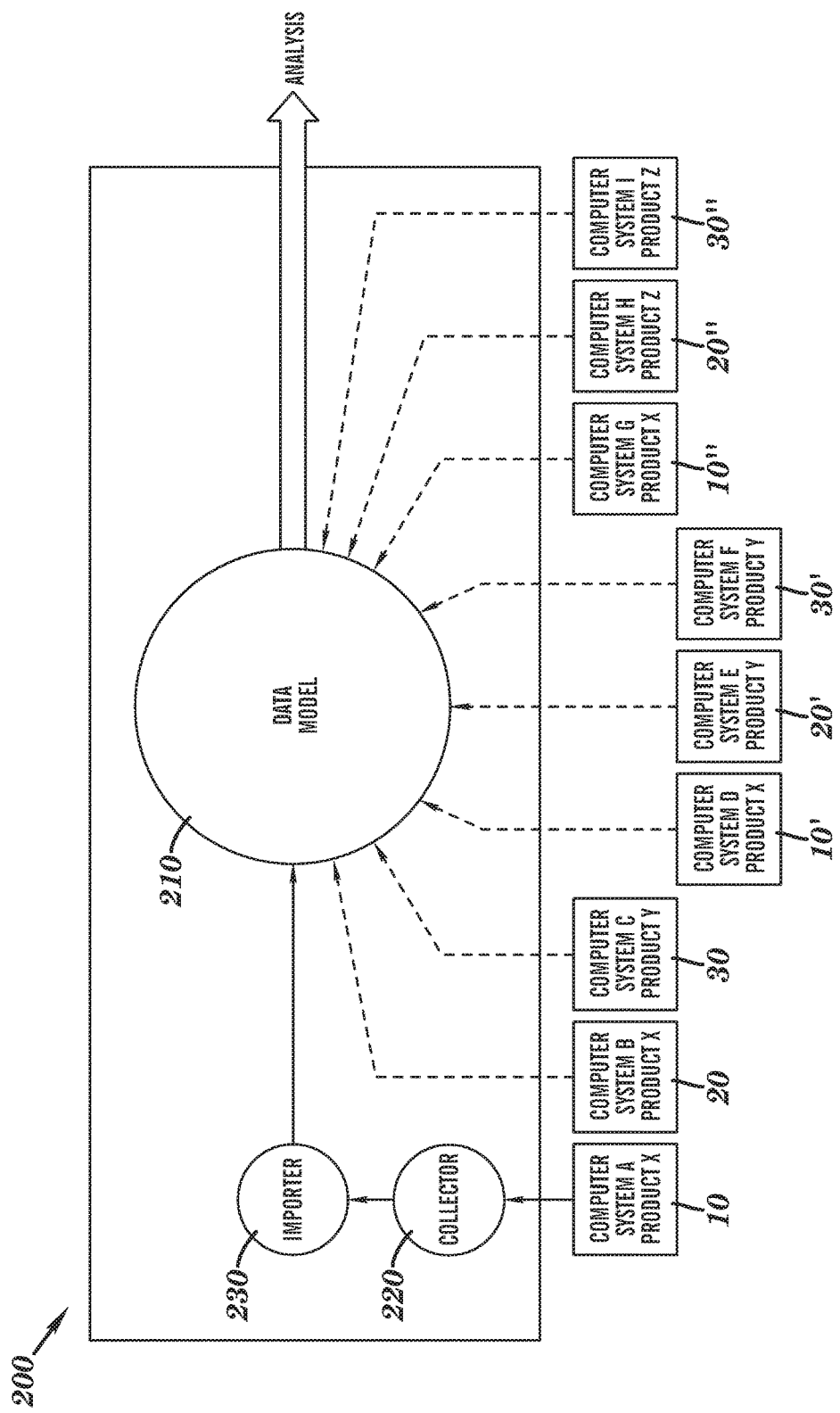
FIG. 3 is schematic representation of a system and method according to the present invention applied to a plurality of computer systems.

FIG. 3 shows how the invention can be applied to a plurality of sources. Thus, FIG. 3 shows that customer 1 uses three computer systems 10, 20, 30 using products X, X and Y respectively as in FIG. 1; customer 2 uses three different computer systems 10', 20', 30' using products X, Y and Y respectively; and customer 3 uses a further three different computer systems 10", 20", 30" using products X, Z and Z respectively. In this embodiment, each computer system is a back up system, but may be a computer system 152, 154, 156 in the primary storage layer 150 in other embodiments, as discussed below.

A collector 220 interrogates each of the computer systems 10, 20, 30, 10', 20', 30', 10", 20", 30" and generates one or more dump files 225 for each. A different type of collector 220 is provided for each of products X, Y and Z. An importer 230 then operates on each of the dump files to extract the required information, to translate it into the normalized format data and store it in the database 210. Thus, configuration and state information for all 9 computer systems 10, 20, 30, 10', 20', 30', 10", 20", 30' is stored in the database 210 in a normalized format. The data stored in the database 210 can therefore be analyzed irrespective of the environment (media types and the product type) of the various sources.

The normalized format allows information to be stored about each item of data originating from a source in view of the data hierarchy, as well as how and where the data is stored in the back up system. The data hierarchy includes which customer owns the data; which of the sites operated by the customer the data originates from; and which of the multiple source environments associated with a site the data is created in. The source environments may, for example, be different operating systems. Each source environment backs up multiple nodes, where the nodes may include, for example, clients such as different servers or different workstations. Moreover, each source environment contains back up objects.

Each object is created when a back up is run and is associated with a node. Each object has at least one copy but can have multiple copies. Each copy is stored on one or a number of fragments, and each fragment is stored on a piece of media, such as a physical tape, a virtual tape or a disk. There may be multiple fragments, for example, where two copies of the object are made, where one object is written in series but split between tapes due to space constraints or where different parts of the object are written to different media in parallel. Media relating to a physical tape can either be offline, near-line in a library, or in a stand-alone drive. Media relating to a virtual tape will always be in a library. There are also a number of other factors in the data hierarchy that may be considered and are known to those skilled in the art.

From the foregoing, it will be apparent that the predetermined data include in the data model may include as non-limiting examples an identification (ID) of the customer, a customer site ID, source information, node information, back up object information, and fragment information.

Where the system is used for a number of clients, the customer identification allows index data to be stored for a plurality of different clients in the same database 210. The customer site ID may be used to distinguish between different sites at which the customer operates. The source and node information will provide information about the source and the node associated with objects backed up by the respective back up systems 10, 20, 30. The object information may include back up date, size, number of files, data type (file system/Oracle/SQL/Exchange etc), backup type (full/incremental etc), expiry date etc. The back up objects are mapped to fragments, which are in turn mapped to the physical storage media. In addition, the data model preferably includes, and database 210 stores, information relating to the back up systems 10, 20, 30 themselves and the back up servers 40, 45.

Figure 4:
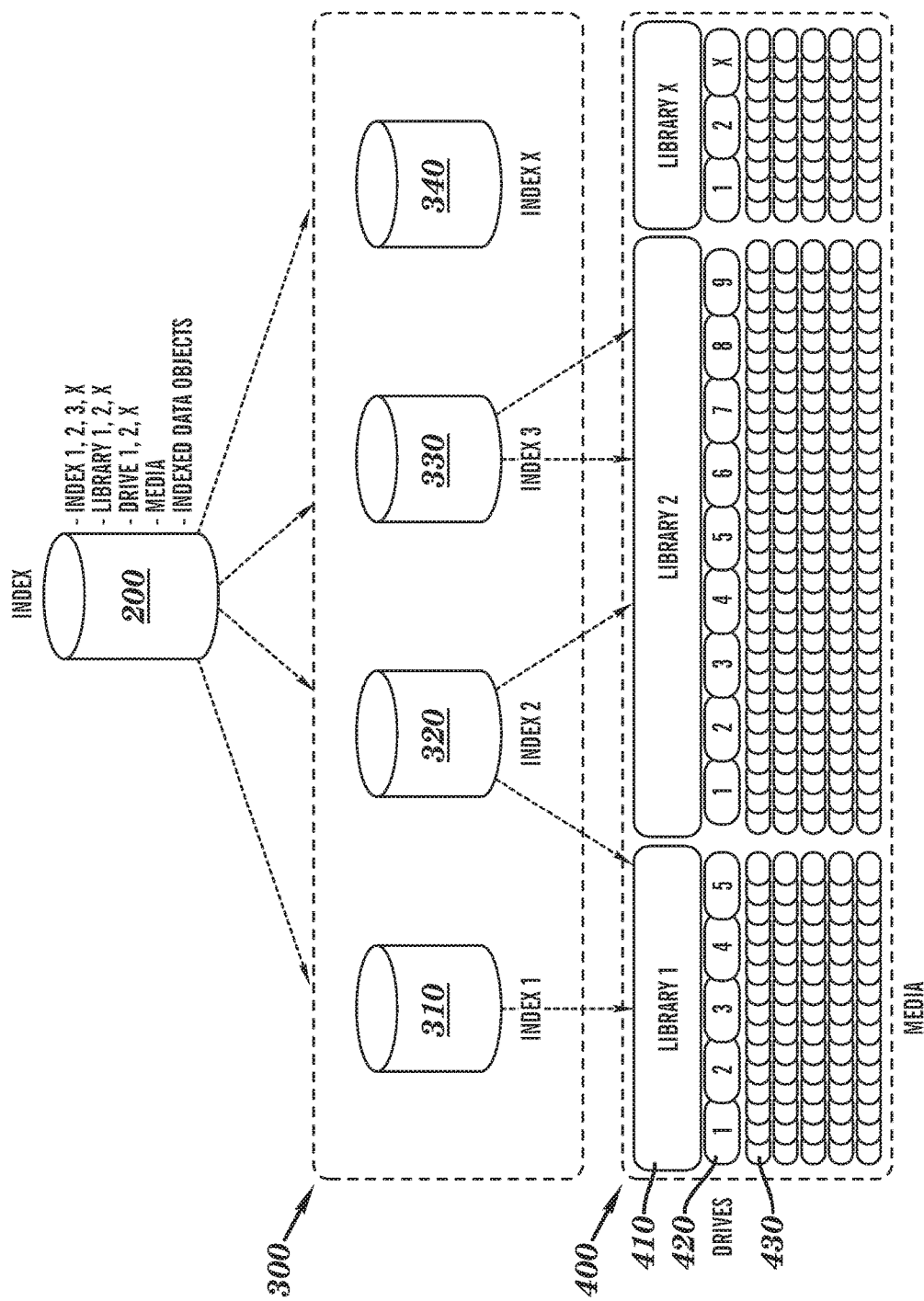
FIG. 4 is schematic representation of another system according to the present invention.

FIG. 4 is an alternative, exemplary arrangement according to the present invention. In the arrangement of FIG. 4, there are provided a plurality of distinct layers, namely a media layer 400, a back up server layer 300, and database layer 200. The arrangement 14 is owned by a large entity organization. The back up system layer includes four back up servers 310, 320, 330, 340 each using different proprietary back up systems—in this example, EMC2®, Tivoli®, Hp®, and Symantec® back up systems. It should be appreciated that these systems are exemplary only and other systems could be used in their place. Each back up server 310, 320, 330, 340 backs data up data from a primary storage layer 150 (not shown) to a common media layer 400, which includes a plurality of libraries 410. Each library 410 includes a number of tape or other media drives 420 and a number of tapes 430 or other physical media. The loading and unloading of tapes 430 into the drives 420 of a library 410 is automated.

Each back up server 310, 320, 330, 340 is adapted to write to and read from one or more libraries and stores an index in proprietary format of the data it has stored in a library or the libraries 410. Using respective collectors 220 and importers 230 adapted to interrogate the proprietary back up systems 310, 320, 330, 340, extract predetermined data from them, and translate the extracted data into a normalized format, an index of the data in each of the indexes is created and stored in a normalized format in the database layer 200.

It should be recognized that the data stored in the media 400 is not itself stored in the database 210. Rather, the database 210 stores an index of indexes in a normalized format. Thus, in a real world situation, the database layer may index the data of 300 different customers, providing an index of only several hundred GB in size for around 1 exabyte ($10^{18}$) of data.

Using the normalized state and configuration data stored in the database 210, it becomes possible to carry out powerful analysis of the data stored in the media layer 400, as well as the effectiveness and efficiency of the various back up servers 310, 320, 330, 340 in the back up layer 300. In effect, the normalized data stored in the database layer 200 allows the skilled addressee to establish what components are in the back up system 300, 400, how it works, how data is stored in it, how efficiently data is stored in it, what its total capacity and remaining capacity are, and what it costs.

For example, it becomes possible to analyze existing environments in a customer system and provide a detailed analysis of various factors. These may include, as non-limiting examples, existing hardware infrastructure (media libraries, servers, drives; vendors and models; quantities; locations; and so on); storage capacity in total and broken down into various sites, libraries etc; the amount of data stored and the types of data (for example, Windows®, Oracle®, SAP® and so on); cost of ownership and running; power usage and so forth. This analysis further allows accurate projections to be made of future system requirements and the justification of infrastructure refresh and replacement projects. For example, various key performance indicators may be established for each of several alternative technologies, in order to allow the modeling of different workloads on the different technologies. In this way it is possible to provide various mathematically calculated, sized and priced solutions based on the normalized data stored in the database 210 demonstrating what savings in storage space and expenditure can be established if various different technologies are adopted.

The configuration and state information stored in a normalized format in the database 210 may further be used to control and optimize the execution of infrastructure migration projects, for example as legacy back up systems are replaced and the backed up data is migrated across to new back up systems. The normalized information also allows the ongoing monitoring of computer infrastructure against service level targets.

Figure 5:
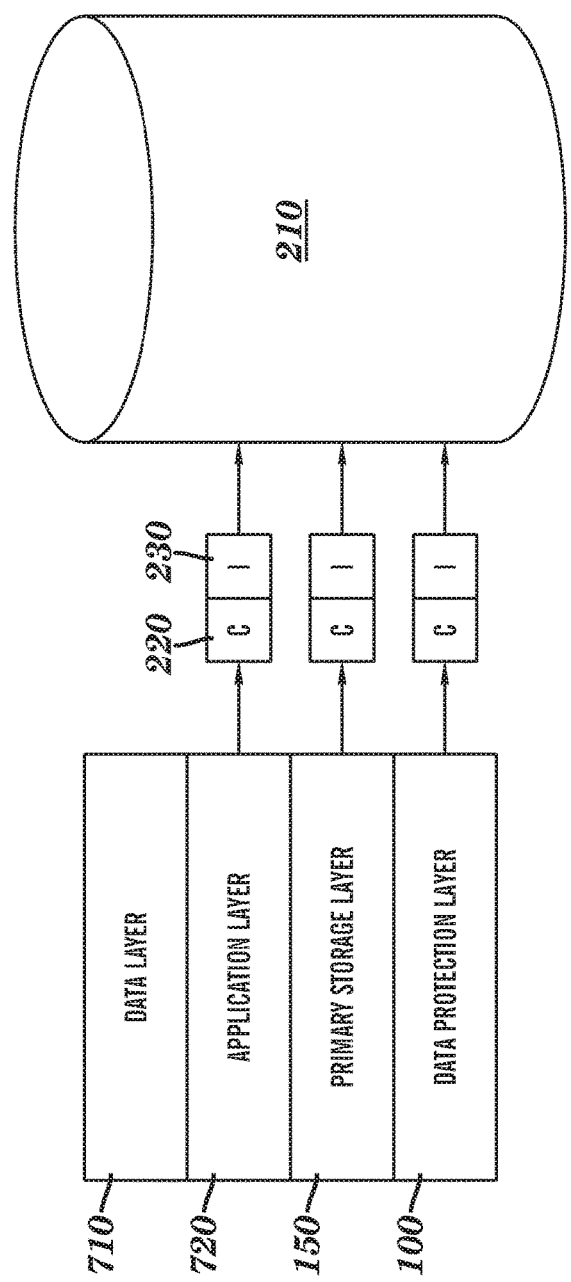
FIG. 5 is a schematic representation of a system and method according to a further aspect of the present invention.

Although the present invention has so far been described with reference to back up systems, it should be appreciated that it is not limited to them. As shown in FIG. 5, a customer will have various layers within its IT architecture. These include a raw data layer 710, an application layer 720, a primary storage layer 150 and a data protection layer 100. The back up systems 10, 20, 30; 300, 400 shown in the figures discussed above fall within the data protection layer 100.

As FIG. 5 shows, collectors 220 and importers 230 may be used to interrogate the data protection layer 100 in the manner discussed above to develop a normalized index of the data stored in the data protection layer 100 irrespective of the back up system product or vendor.

Alternatively, collectors 220 may interrogate the primary storage layer 150, which acts as the source for the back up layer 100. The primary storage layer may include servers, desktops and laptops, which may be split across various sites, and use hardware and software from different vendors and having different formats. Thus, the primary storage layer 150 may have a significant degree of complexity, usually comparable to or greater than that of the data protection (back up) layer 100. The collectors 220 interrogate the primary storage layer 150 in the same way as described above for the data protection layer 100, and different collectors 220 may be provided for different vendor and/or product specific hardware and software within the primary storage layer 150. In the same way as before, the collectors 220 generate dump files 225 and importers 230 operate on the dump files to extract predetermined indexing data, translate the extracted data into the normalized format and store it in the database 210.

In the same way as for the data protection layer 100, the normalized data extracted for the primary storage layer makes it possible to analyze existing primary storage layer environments in a customer system and provide a detailed analysis of various factors such as existing hardware infrastructure (servers, desktops, laptops; vendors and models; quantities; locations; and so on); storage capacity in total and broken down into various sites, clients etc; the amount of data stored and the types of data (for example, Windows®, Oracle®, SAP® and so on); cost of ownership and running; system speeds and access times; power usage and so forth. This analysis further allows accurate projections to be made of future system requirements and the justification of infrastructure refresh and replacement projects. The configuration and state information stored in a normalized format in the database 210 may further be used to control and optimize the execution of infrastructure migration projects, for example as legacy primary storage layer systems are replaced and the data stored in them is migrated across to new primary storage layer systems. The normalized information also allows the ongoing monitoring of primary storage layer computer infrastructure against service level targets.

Collectors 220 and importers 230 may also be used to interrogate the application layer 720 and store normalized indexing data in the database 210—that is, the present invention may also interrogate the data held or used by various applications accessing the primary storage layer 150. As an example, the collectors may be used to establish which data is used by which applications. Again, the collectors 220 and importers 230 may be specific to one or more applications.

Thus, the present invention may be used to establish normalized indexing data of the data stored in any one or more of the application layer 720, primary storage layer 150 and data protection layer 100. Taken separately, powerful analysis may be made of the components in each layer and their efficiency and effectiveness. However, when data on two or more layers is combined, yet more powerful analysis may be carried out. For example, it becomes possible to track where one email in Outlook is used and stored throughout the application, primary storage layer and data protection layer stack.

This may lead to further efficiencies and costs savings. For example, the analysis may allow improvements in data management systems so that it is possible to improve data access times to different and often conflicting clients and remove bottlenecks, to manage the transfer of data within and between sites, to justify refreshing and replacing hardware, to reduce costs and so on.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for data analysis of a backup system, the method comprising:
    extracting predetermined configuration and state information from respective dump files of a plurality of different computer systems, the predetermined configuration and state information is in different native formats based on the respective dump file from which it was extracted;
    translating the predetermined configuration and state information from a native format used by each of the plurality of different computer systems into a normalized format, wherein the translated configuration and state information comprises configuration and state information irrespective of which of the plurality of different computer systems from which it was generated; and
    determining what components are in the backup system, how the backup system works, how data is stored in the backup system, how efficiently data is stored in the backup system, a total capacity of the backup system, a remaining capacity of the backup system, and an operating cost of the backup system by analyzing the normalized predetermined configuration and state information.

2. The method according to claim 1, wherein the native format used by each of the plurality of different computer systems is a vendor specific data format or a product specific data format.

3. The method according to claim 1, wherein each of the plurality of different computer systems is at least one of a backup computer system, a primary storage layer computer system and an application layer computer system.

4. The method of claim 1, wherein the plurality of computer systems store data on at least two different types of storage media.

5. The method according to claim 1, wherein the plurality of different computer systems use at least two different proprietary data formats.

6. The method according to claim 1, wherein the plurality of computer systems are geographically dispersed.

7. The method according to claim 1, wherein the configuration and state information relates to a plurality of objects stored on the plurality of different computer systems and comprises metadata about the plurality of objects.

8. A method for data analysis of a backup system, the method comprising:
    generating a dump file for each of a plurality of different computer systems, each dump file comprising configuration and state information about each of the plurality of different computer systems in a native format used by each of the plurality of different computer systems on which data is stored;
    extracting the configuration and state information from the respective dump files of the plurality of different computer systems, the configuration and state information being in different native formats based on the dump file from which it was extracted;
    translating the configuration and state information from the native format used by each of the plurality of different computer systems into a normalized format, wherein the translated configuration and state information comprises configuration and state information irrespective of which of the plurality of different computer systems from which it was generated; and
    analyzing the normalized configuration and state information to determine what components are in the backup system, how the backup system works, how data is stored in the backup system, how efficiently data is stored in the backup system, a total capacity of the backup system, a remaining capacity of the backup system, and an operating cost of the backup system.

9. The method according to claim 8, wherein the native format used by each of the plurality of different computer systems is a vendor specific data format or a product specific data format.

10. The method according to claim 8, wherein each of the plurality of different computer systems is at least one of a backup computer system, a primary storage layer computer system and an application layer computer system.

11. The method according to claim 8, wherein the plurality of computer systems store data on at least two different types of storage media.

12. The method according to claim 8, wherein the plurality of different computer systems use at least two different proprietary data formats.

13. The method according to claim 8, wherein the plurality of computer systems are geographically dispersed.

14. The method according to claim 8, wherein the configuration and state information relates to a plurality of objects stored on the plurality of different computer systems and comprises metadata about the plurality of objects.

15. A method for data analysis of a backup system, the method comprising:
generating a dump file for each of a plurality of different computer systems, each dump file comprising configuration and state information about each of the plurality of different computer systems in a native format used by each of the plurality of different computer systems on which data is stored;
extracting predetermined configuration and state information from the respective dump files of the plurality of different computer systems, the predetermined configuration and state information being in different native formats based on the dump file from which it was extracted;
translating the predetermined configuration and state information from the native format used by each of the plurality of different computer systems into a normalized format, wherein the translated configuration and state information comprises configuration and state information irrespective of which of the plurality of different computer systems from which it was generated;
analyzing the normalized predetermined configuration and state information to determine a total capacity of the backup system and a remaining capacity of the backup system; and
projecting future system requirements of the backup system based on analyzing the predetermined configuration and state information.

16. The method according to claim 15, wherein the native format used by each of the plurality of different computer systems is a vendor specific data format or a product specific data format.

17. The method according to claim 15, wherein each of the plurality of different computer systems is at least one of a backup computer system, a primary storage layer computer system and an application layer computer system.

18. The method according to claim 15, wherein the plurality of computer systems store data on at least two different types of storage media.

19. The method according to claim 15, wherein the plurality of different computer systems use at least two different proprietary data formats.

20. The method according to claim 15, wherein the plurality of computer systems are geographically dispersed.

* * * * *